Nov. 11, 1958  C. L. SARVER  2,859,981
CONNECTION FACILITATING TRAILER HITCH
Filed April 18, 1955  2 Sheets-Sheet 1

Carter L. Sarver
INVENTOR.

BY
*Attorneys*

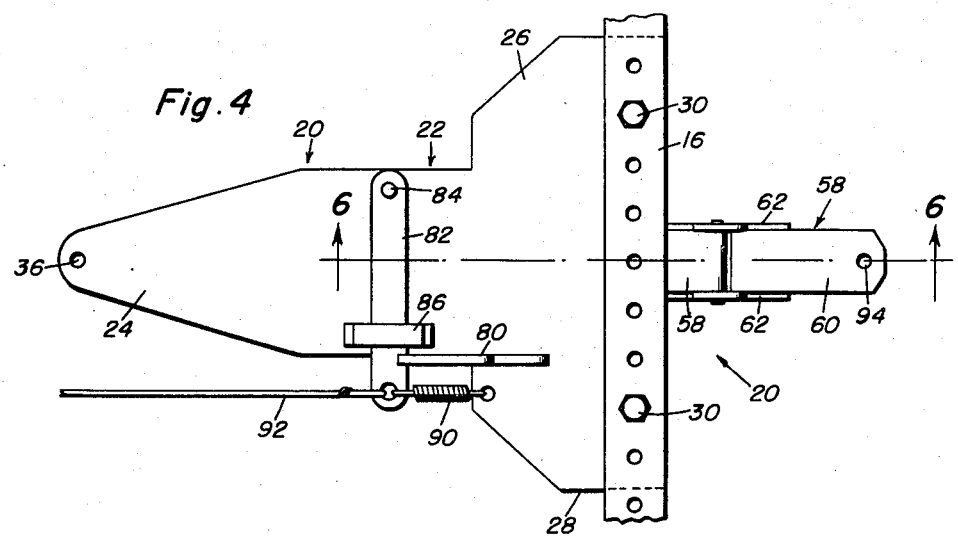
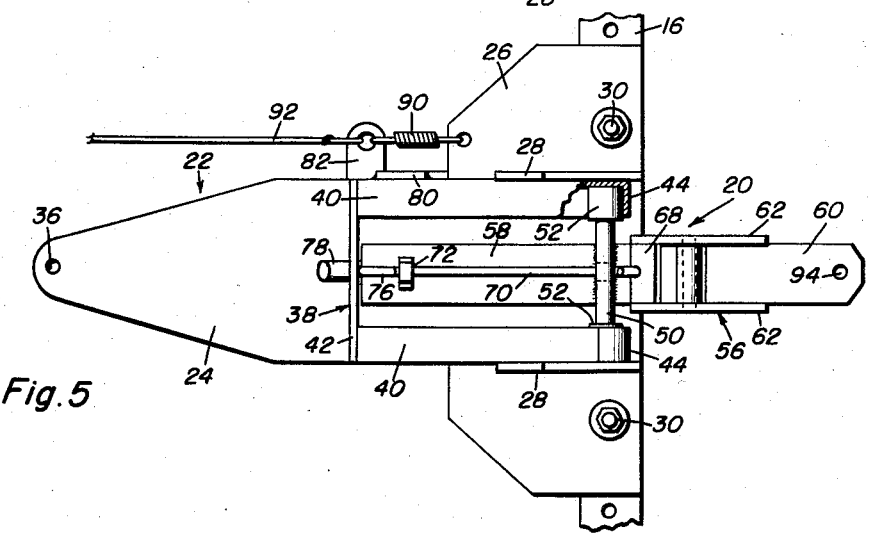
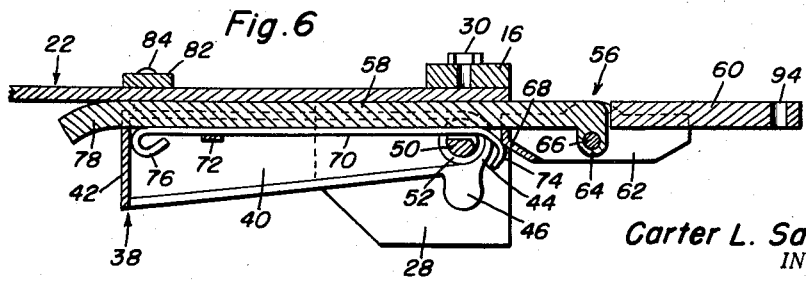
Carter L. Sarver
INVENTOR.

ered Nov. 11, 1958

2,859,981

CONNECTION FACILITATING TRAILER HITCH

Carter L. Sarver, Princeton, Ill.

Application April 18, 1955, Serial No. 501,854

2 Claims. (Cl. 280—477)

This invention relates in general to new and useful improvements in farm implements, and more specifically to an improved hitch assembly for connecting farm implements to tractors.

The average farm implement is a two-wheeled affair, or, in some cases, is supported solely by a trailing wheel. Such implements are usually towed through the use of a tow pole which, when the implement is disconnected from a tractor, rests upon the ground. In order to connect the tow pole of the implement to the tractor hitch bar, it is necessary for one to raise not only the tow bar but a large portion of the implement. It is readily apparent that this is undesirable and should be overcome if at all possible.

It is therefore the primary object of this invention to provide an improved tractor hitch for connecting implements to a tractor, the tractor hitch being of such a nature whereby a tow pole may be connected to the tractor while the tow pole is substantially lying upon the ground.

Another object of this invention is to provide an improved hitch construction for attaching tow poles of implements to tractors, the hitch construction being of such a nature whereby the tow pole may be connected to a tractor while the tow pole is substantially resting upon the ground and being of such a nature whereby the tow pole is automatically raised and locked in position with respect to the tractor upon the exerting of first a backward push and then a forward pull upon the tow pole.

Still another object of this invention is to provide an improved hitch assembly for use in conjunction with tractors, the hitch assembly being of such a nature whereby it may be conveniently mounted on the hitch bar of a tractor without any modifications to the tractor.

A further object of this invention is to provide an improved tractor hitch which includes a tow bar formed in sections, the sections being pivotally connected together so that a lowermost one of the sections may rest substantially upon the ground for each of connection to a tow pole of an implement, there being provided means for locking the sections together in alignment upon the exertion of first a backward push and then a forward pull upon the tractor hitch.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a fragmentary top plan view of the tractor hitch and shows it secured to the hitch bar of the tractor;

Figure 5 is a bottom plan view of the tractor hitch and shows it connected to the hitch bar only of a tractor, a portion of a track of the hitch being broken away and shown in section in order to clearly illustrate the details of a tow pin with respect to the track; and Figure 6 is a fragmentary longitudinal vertical sectional view taken through the tractor hitch substantially upon the plane indicated by the section line 6—6 of Figure 4 and shows the details of the hitch on a larger scale.

Figure 1:
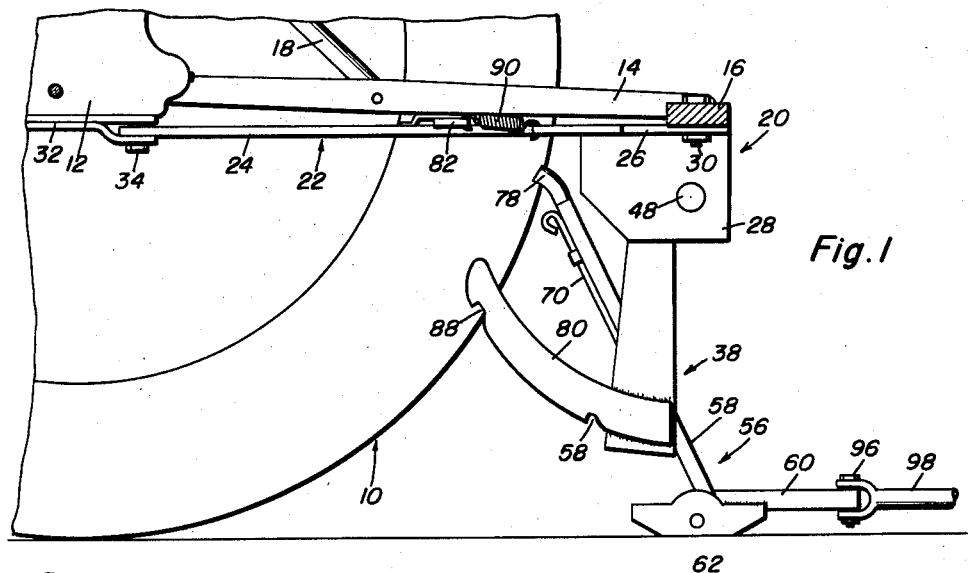
Figure 1 is a sectional view taken through the rear portion of a tractor and showing the hitch bar thereof in section, there being illustrated only the extreme rear portion of the tractor and there being connected to the hitch bar of the tractor the tractor hitch which is the subject of this invention, the tractor hitch being shown in initial position after being connected to a tow pole.
Figure 2:
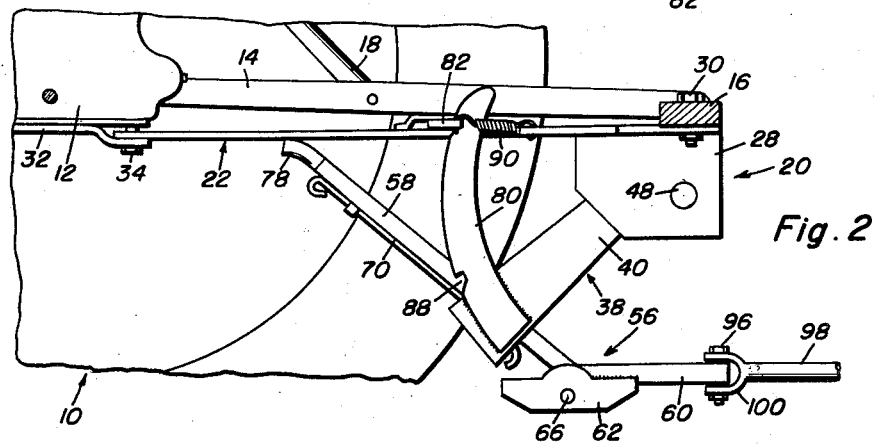
Figure 2 is a fragmentary vertical sectional view similar to Figure 1 and shows the relationship of the various parts of the tractor hitch after a slight push has been exerted thereon.
Figure 3:
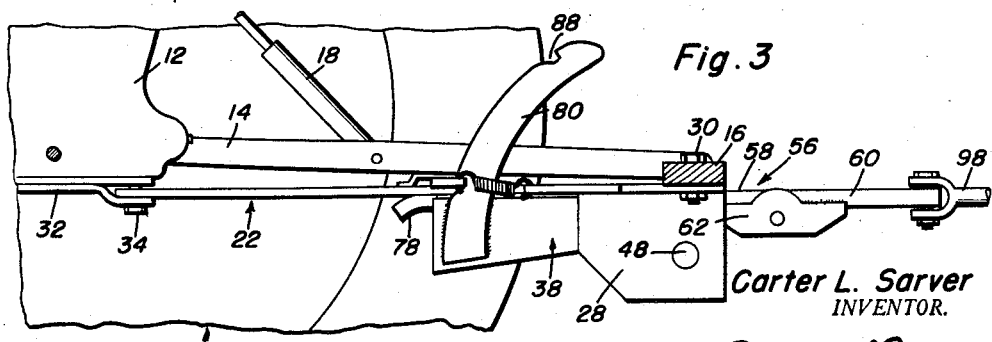
Figure 3 is a fragmentary vertical sectional view similar to Figure 2 and shows the tractor hitch after a forward pull has been exerted thereon and it has moved into a locked position.

Referring now to the drawings in detail, it will be seen that there is illustrated in Figures 1, 2 and 3 a rear portion of a conventional type of tractor which is referred to in general by the reference numeral 10. The tractor 10 includes a rear frame structure 12 which has pivotally connected thereto a pair of support arms 14. The support arms 14 extend rearwardly from the tractor frame 12 and have connected to rear ends thereof a transverse hitch bar 16. The arms 14 have connected thereto lift rods 18 which are normally used for vertically positioning the hitch bar 16. Secured to the hitch bar 16 and the frame 12 is the tractor hitch which is the subject of this invention, the tractor hitch being referred to in general by the reference numeral 20.

The tractor hitch 20 includes a generally T-shaped mounting plate which is referred to in general by the reference numeral 22. The mounting plate 22 includes an elongated stem portion 24 which is longitudinally disposed. Formed integrally with the stem portion 24 at the rear end thereof is a cross-portion 26. The cross-portion 26 is provided at its outer edges with depending flanges 28.

As is best illustrated in Figure 1, the mounting plate 22 has the cross-portion 26 thereof underlying the hitch bar 16 and secured thereto by suitable fasteners 30. Also, there is carried by the frame 12 a fitting 32 including a vertical pivot pin 34. The forward end of the stem portion 24 is pivotally mounted on the pivot pin 34, the pivot pin 34 passing through a bore 36 in the forward end of the stem portion 24.

Disposed beneath the mounting plate 22 is a track assembly which is referred to in general by the reference numeral 38. The track assembly 38 is U-shaped in plan view and includes a pair of opposed tracks 40 which are connected together at their forward ends by a transverse bar 42. The rear ends of the tracks 40 are closed by stops 44.

The track assembly 38 is disposed beneath the mounting plate 22 and is pivotally connected to the flanges 28. As is best illustrated in Figure 6, the rear portion of each of the tracks 40 is provided with a depending ear 46. Carried by each of the ears 46 is an outwardly projecting pivot pin 48 pivotally disposed in the associated flange 28. In this manner, the track assembly 38 is pivotally mounted with respect to the mounting plate 22.

Extending between the tracks 40 is a tow pin 50. The tow pin 50 is provided at its opposite ends with rollers 52 disposed within the confines of the tracks 40. As is best illustrated in Figure 6, the tracks 40 are tapered, with the widest portion of the tracks 40 being forwardly disposed. The rear portion of each track 40 is of a size to snugly receive the roller 52. However, the forward portion of each track 40 is such that freedom of movement of the roller 52 is permitted so that tilting of the tow pin 50 is permitted when the rollers 52 are disposed in the forward portions of the tracks 40.

The tow pin 50 is a part of a tow bar which is referred to in general by the reference numeral 56. The tow bar 56 is sectional and includes a forward section 58 and a rear section 60. The rear section 60 is provided at its forward end with depending, forwardly extending flanges 62, the flanges being in spaced parallel relation at opposite sides of the rear section 60. The forward section 58 includes a rear depending portion 64 disposed between the flanges 62. Passing through the rear portion 64 and connecting the same to the flanges 62 for pivotal movement is a pivot pin 66.

The forward ends of the flanges 62 are connected together by a transverse bar 68. The bar 68 is so proportioned, that the downward pivoting of the forward section 58 with respect to the rear section 60 is limited to a horizontal position in alignment with the rear section 60, as is best illustrated in Figure 6.

In order that the forward section 58 may be locked in alignment with the rear section 60, there is provided a longitudinally disposed latch member 70. The latch member 70 underlies the forward section 58 and is retained in position with respect thereto by a guide 72 and the tow pin 50, the latch 70 passing between the tow pin 52 and the underside of the forward section 58. The rear end of the latch 70 is bent downwardly, as at 74, for engagement with a cross-bar 68 to prevent relative pivoting between the forward section 58 and the cross-bar 68. The latch 70 is held in a rearward position by engagement of a forward cam portion 76 with the cross-bar 42.

The forward end of the forward section 58 is provided with a centrally disposed forwardly projecting pin 78. The pin 78 is initially engageable with the underside of the mounting plate 22 and is disposed in downwardly sloping relation with respect to the frame of the forward section 58.

As was previously described, the track assembly 38 is pivotally connected to the mounting plate 22. In order that the track assembly 38 may be locked with respect to the mounting plate 22, there is carried by one of the tracks 40 an arm 80. The arm 80 is arcuate in end elevation and it is disposed closely adjacent one edge of the stem portion 24. Pivotally carried by the stem portion 24 in transverse relation is a latch 82. The latch 82 is connected to the stem portion 24 by a pivot pin 84 and is guided by a strap 86. The latch 82 is engageable in one of a plurality of notches 88 formed in the arm 80.

In order that the latch 82 may be retained in engagement with the arm 80, there is provided a spring 90. The spring 90 is connected to the free end of the latch 82 and extends between the latch 82 and the cross-portion 26 of the mounting plate 22. Also connected to the latch 82 is a pull cable 92. The pull cable 92 extends forwardly from the latch 82 and is anchored at a position convenient to the operator's seat (not shown) of the tractor 10 for manipulation by the operator of the tractor 10.

The rear end of the rear section 60 of the tow bar 56 is provided with a vertical bore 94. The bore 94 is intended to have received therethrough a pin 96 of a tow pole 98, the tow pole 98 being provided with a bifurcated forward end 100 carrying the pin 96.

Referring now to Figure 1 in particular, it will be seen that the tow pole 98 has been connected to the tractor 10 by means of the tractor hitch 20. At this time, the track assembly 38 has been released and is in depending relation. Further, the tow bar assembly 56 has been broken and the flanges 62 rest upon the ground with the rear section 60 extending rearwardly and being connected to the tow pole 98 through the use of the pin 96. At this time, the forward end of the tow pole 98 is only a very slight distance above the ground. It is pointed out that in order to connect the tow pole 98 to the rear section 60, it is merely necessary to lift the tow pole 98 a very slight distance. Further, because of the looseness of the fit between the tow pin rollers 54 and the tracks 40 when in the position illustrated in Figure 1, side movement of the tow bar assembly 56 may be accomplished for properly aligning the tow bar sections 60 with the tow pole 98.

After the connection in Figure 1 has been accomplished, the tractor 10 is moved rearwardly with the result that the track assembly 58 is pivoted forwardly and upwardly so that the arm 80 is initially engaged with the latch 82. At this time, the pin 78 engages the underside of the mounting plate 22.

Next, a forward movement of the tractor 10 is made in order that a pull may be exerted on the tow pole 98. This results in the sliding of the tow pin 50 up between the tracks 40 and the resultant simultaneous raising of the tow bar assembly 56 and the pivoting of the section 58 with respect to the section 60. Inasmuch as the final position of the tow pin 50 is above the axis of the pivot pins 48 for the track assembly 38, the track assembly 38 will be swung up into a horizontal towing position, such as that illustrated in Figures 3 and 6. At this time, a latch 82 locks the arm 80 in its elevated position. Further, the tow bar sections 58 and 60 have now swung so as to be in horizontal planar relationship, as is best illustrated in Figure 6.

As the tow bar assembly 56 pivots upwardly to its position of Figure 6, the cam surface 76 of the latch 70 engages the cross-bar 42. As further upward straightening movement is accomplished, the cross-bar 42 forces the latch 70 inwardly to lock the tow bar sections 58 and 60 in alignment.

When it is desired to disconnect the tow pole 98, it is merely necessary to release the arm 80 by pulling on the cable 92 and slowly backing up the tractor 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A tractor hitch comprising a mounting plate adapted to be secured to a hitch bar of a tractor, a track assembly hingedly secured to said mounting plate in depending relation, cooperating latch means on said mounting plate and said track assembly for retaining said track assembly in a raised position, a tow bar, a tow pin carried by said tow bar and slidably retained in said track assembly whereby said tow bar may be lowered adjacent the ground for connection to a tow pole of a farm implement, said tow bar being formed in hinged sections, means carried by one of said sections for locking said sections into a unit, said means including a sliding latch engaged and moved by said track assembly to a latching position in response to upward pivoting of said track assembly.

2. A tractor hitch comprising a mounting plate adapted to be secured to a hitch bar of a tractor, a track assembly hingedly secured to said mounting plate in depending relation, cooperating latch means on said mounting plate and said track assembly for retaining said track assembly in a raised position, a tow bar, a tow pin carried by said tow bar and slidably retained in said track assembly whereby said tow bar may be lowered adjacent the ground for connection to a tow pole of a farm implement, said tow bar being formed in hinged sections, means carried by one of said sections for automatically locking said sections into a rigid unit when said tow bar is raised.

References Cited in the file of this patent

UNITED STATES PATENTS

| | | |
|---|---|---|
| 793,787 | Heser | July 4, 1905 |
| 2,230,801 | Jager | Feb. 4, 1941 |
| 2,415,968 | Price | Feb. 18, 1947 |
| 2,464,424 | Weldon et al. | Mar. 15, 1949 |
| 2,580,545 | Hill | Jan. 1, 1952 |
| 2,650,833 | Wells | Sept. 1, 1953 |
| 2,703,243 | Clark | Mar. 1, 1955 |